US008525820B2

(12) United States Patent
Hong et al.

(10) Patent No.: US 8,525,820 B2
(45) Date of Patent: Sep. 3, 2013

(54) DRIVING CIRCUIT, LIQUID CRYSTAL DISPLAY DEVICE AND METHOD OF DRIVING THE SAME

(75) Inventors: Young Gi Hong, Gumi-si (KR); Jae Yeol Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 1405 days.

(21) Appl. No.: 11/451,069

(22) Filed: Jun. 12, 2006

(65) Prior Publication Data

US 2006/0284820 A1 Dec. 21, 2006

(30) Foreign Application Priority Data

Jun. 20, 2005 (KR) ........................ 10-2005-0052917

(51) Int. Cl.
*G06F 3/042* (2006.01)

(52) U.S. Cl.
USPC ............... 345/211; 345/87; 345/204; 345/52; 345/100; 345/690

(58) Field of Classification Search
USPC .............................. 345/100, 89, 204; 377/64
See application file for complete search history.

(56) References Cited

U.S. PATENT DOCUMENTS

| | | | | |
|---|---|---|---|---|
| 4,074,256 | A * | 2/1978 | Sekiya et al. | 345/49 |
| 5,248,963 | A * | 9/1993 | Yasui et al. | 345/98 |
| 6,369,516 | B1 * | 4/2002 | Iketsu et al. | 315/169.3 |
| 6,414,670 | B1 * | 7/2002 | Kim | 345/98 |
| 7,145,545 | B2 * | 12/2006 | Zebedee et al. | 345/100 |
| 7,271,801 | B2 * | 9/2007 | Toyozawa et al. | 345/211 |

FOREIGN PATENT DOCUMENTS

| | | | | |
|---|---|---|---|---|
| JP | 03005998 | A | * | 1/1991 |
| KR | 1020000019835 | A | | 4/2000 |

OTHER PUBLICATIONS

Office Action issued in corresponding Korean Patent Application No. 9-5-2012-023437716, mailed Apr. 23, 2012.

* cited by examiner

*Primary Examiner* — Grant Sitta
(74) *Attorney, Agent, or Firm* — Brinks Hofer Gilson & Lione

(57) ABSTRACT

An LCD capable of discharging a residual voltage of a panel and a method of driving the same are provided. In the LCD, a gate signal is supplied to the liquid crystal panel during a time interval when a supply voltage is shut off, and a residual voltage is discharged.

16 Claims, 3 Drawing Sheets

| Vcc | GSP | OUTPUT |
| --- | --- | --- |
| High | High | High |
| High | Low | Low |
| Low | High | High |
| Low | Low | High |

DRIVING CIRCUIT, LIQUID CRYSTAL DISPLAY DEVICE AND METHOD OF DRIVING THE SAME

This application claims the benefit of priority to Korean patent application 52917/2005, filed on Jun. 20, 2005, which is incorporated herein for all purposes by reference.

1. Technical Field

The present application relates to a liquid crystal display device (LCD), and more particularly, to an LCD capable of discharging a residual voltage of a panel.

2. Description of the Related Art

An LCD is a typical flat display device which displays an image by controlling an amount of a transmitted light according to an image signal. Applications of LCD technology have increased because of weight, physical size, and power consumption advantages.

The LCD includes a liquid crystal panel displaying an image and a driver driving the liquid crystal panel. Additionally, the driver includes a timing controller, a gate driver, and a data driver. The timing controller generates various signals to control the liquid crystal panel. The gate driver generates a gate signal to activate a gate line of the liquid crystal panel in response to a gate control signal in the various signals. The data driver supplies a predetermined image data to a data line of the liquid crystal panel according to a data control signal in the various signals.

The driver (including the timing controller, the gate driver, and the data driver) on a printed circuit board (PCB), etc may be mounted.

Passive elements such as additional resistors or capacitors can be mounted as separate components around input/output terminals of the timing controller, the gate driver, and the data driver in the PCB.

As illustrated in FIG. 1, a discharge circuit 35 includes a resistor Rd and a capacitor Cd connected in parallel to discharge a residual voltage in the liquid crystal panel. Additionally, the discharge circuit 35 is mounted on a terminal of a gate driver 60 connected electrically to a gate line (not shown) of the liquid crystal panel. The resistor Rd and the capacitor Cd are mounted on the PCB as components.

A gate signal Vg (a gate high signal with a high voltage 20 V or a gate low signal with a low voltage −5 V) generated in the gate driver 60 is supplied to the gate line of the liquid crystal panel. That is, the gate high signal is supplied to select a specific gate line, and otherwise the gate low signal is supplied. These processes repeat at each frame. A residual voltage remains because a supplied voltage is not discharged in time. Thus, an unwanted image can be displayed on the liquid crystal panel.

To resolve this problem, as illustrated in FIG. 1, the discharge circuit 35 is mounted on the output terminal of the gate driver 60. The passive elements, including a resistor and a capacitor at the output terminal of the gate driver 60, are mounted on the PCB as components by soldering.

However, when the related art passive elements are mounted at the output terminal of the gate driver through soldering, defects due to the soldering can occur and cause operation faults.

Additionally, since the area that the passive elements occupy around the gate driver is large, it is contrary the trend of lightweight and slimness of the LCD.

SUMMARY

A driving circuit is described, including a gate driver outputting one of a gate signal and a discharge signal, the gate signal driving a liquid crystal panel according to a control signal, and the discharge signal discharges a voltage of the liquid crystal panel.

In another aspect, a liquid crystal display device includes: a liquid crystal panel having gate lines and data lines arranged in a matrix; a gate driver generating a gate signal to activate the gate line; a data driver supplying image data to the data line; and a power supply generating a supply voltage to supply the gate driver and the data driver.

In a further aspect, a method of driving an LCD is disclosed, having a liquid crystal panel with gate lines and data lines arranged in a matrix, and where a gate driver generates a gate signal to activate the gate line, a data driver supplies a predetermined image data to the data line, and a power supply generates and supplies a supply voltage to the gate driver and the data driver, the method including: displaying the image data on the liquid crystal panel in response to the gate signal the supply voltage is present; and discharging the liquid crystal panel by the gate signal during a predetermined interval after the supply voltage is shut off.

DETAILED DESCRIPTION

Exemplary embodiments may be better understood with reference to the drawings, but these embodiments are not intended to be of a limiting nature. Wherever possible, the same reference numbers will be used throughout the drawings to refer to the same or like parts.

Figure 1:
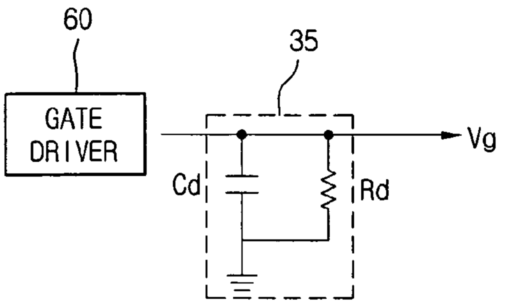
Fig.1 (Related Art)
FIG. 1 is a view of a related art gate driver with an external passive element.
Figure 2:
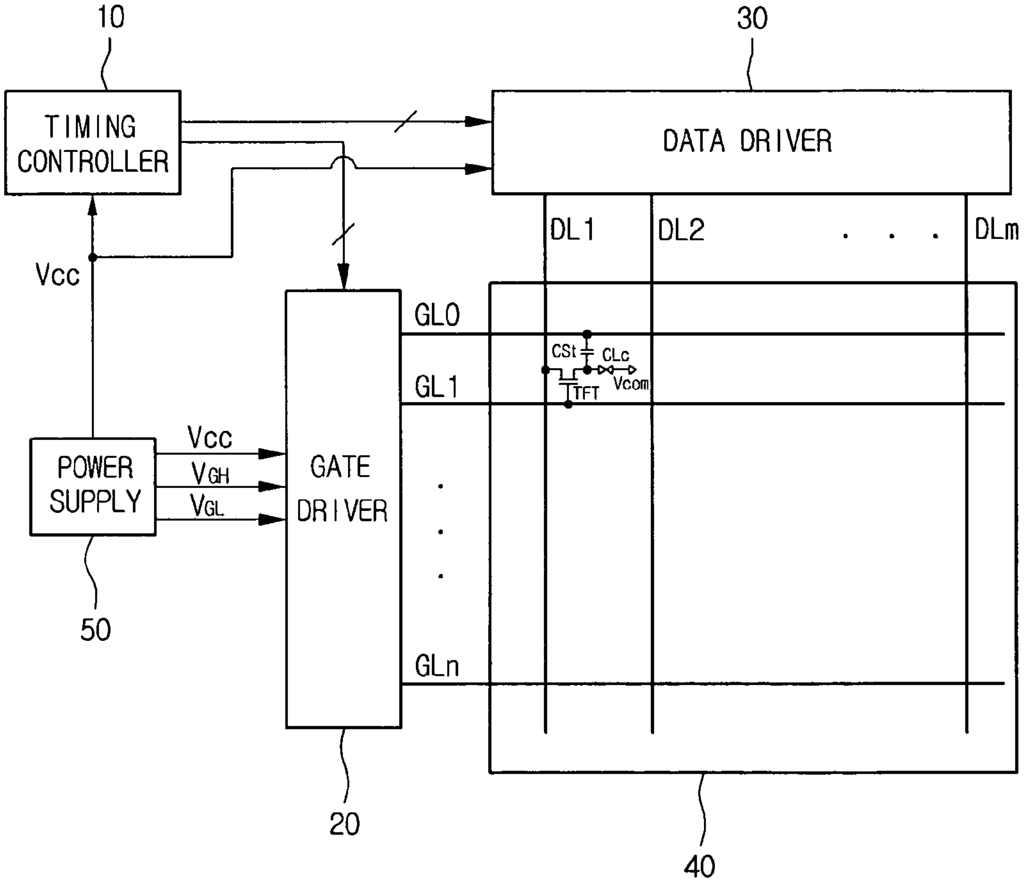
FIG. 2 is a view of an overall configuration of an LCD in an example.

FIG. 2 shows an LCD including a liquid crystal panel 40, a gate driver 20, a data driver 30, and a timing controller 10. The liquid crystal panel 40 displays an image. The gate driver 20 supplies a gate signal to activate gate lines GL1 to GLn of the liquid crystal panel 40. The data driver 30 supplies image data to data lines DL1 to DLm of the liquid crystal panel 40. Additionally, a timing controller 10 generates a control signal to control the gate driver 20 and the data driver 30. A supply voltage Vcc enables the timing controller 10, the gate driver 20, and the data driver 30 to be driven. The LCD further includes a power supply 50 to generate the supply voltage Vcc.

The liquid crystal panel 40 may include an array substrate, a color filter substrate, and a liquid crystal injected between the array substrate and the color filter substrate. The liquid crystal panel 40 may be one of, for example, a twisted nematic (TN) mode, an in-plane switching (IPS) mode, an optically controlled birefringence (OCB) mode, and a vertical alignment (VA) mode device.

In the TN mode device, for example, the array substrate includes gate lines GL1 to GLn and data lines DL1 to DLm disposed perpendicular each other, and pixel regions are defined by intersections of the gate lines GL1 to GLn and the data lines DL1 to DLm. Thin film transistors (TFTs) connected to the gate lines GL1 to GLn and the data lines DL1 to DLm and pixel electrodes connected through the TFTs and contact holes are formed on intersection points of the gate lines GL1 to GLn and the data lines DL1 to DLm. The color filter substrate may include a color filter formed on a position corresponding to the pixel electrode of the array substrate, a black matrix formed between each color filter, and common electrodes formed on the color filter and the black matrix.

The gate driver 20 receives control signals (e.g., GSC, GSP, GOE, etc.) from the timing controller 10 and sequentially supplies a gate signal to the gate lines GL1 to GLn of the liquid crystal panel (40) in response to the control signals.

The data driver 30 receives control signals (e.g., SSP, SSC, SOE, POL, etc.) and image data from the timing controller 10, and supplies the data line DL1 to DLm of the liquid crystal panel 40 with an analog data voltage by converting the image data into gray levels.

The timing controller 10 generates the control signal to control the gate driver 20 and the data driver 30. As described above, the data control signals may include SSP, SSC, SOE, and POL. The gate control signals may include GSC, GSP, and GOE.

The power supply 50 converts, for example, 115 or 220 VAC into a low DC voltage (e.g., a supply voltage Vcc) to drive the LCD. Accordingly, the timing controller 10, the gate driver 20, and the data driver 30 may be driven by the supply voltage Vcc.

Operation of the LCD may also use various additional DC voltages. Such DC voltages may include a reference voltage Vdd for gamma conversion, a voltage driving a light source, which may be a semiconductor device or lamp, for a backlight, and a gate signal (i.e., a gate high voltage VGH and a gate low voltage VGL) outputted from the gate driver 20.

The power supply 50 may also generate the various DC voltages using the supply voltage Vcc.

The supply voltage Vcc may be supplied to the timing controller 10, the gate driver 20, and the data driver 30, and the gate high voltage VGH and the gate low voltage VGL may be supplied to the gate driver 20.

Figure 3:
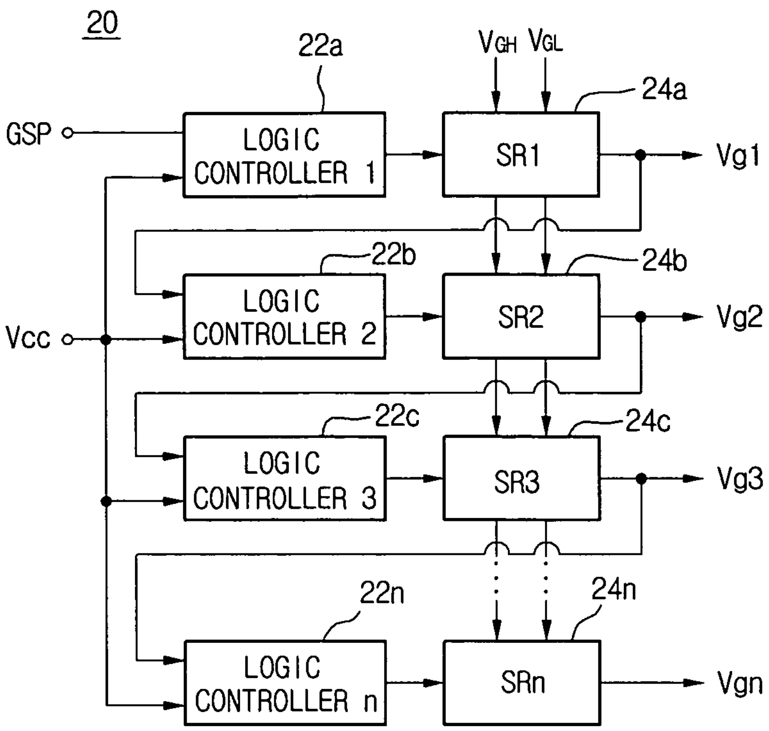
FIG. 3 a block diagram of a gate driver of FIG. 2.

FIG. 3, shows the gate driver 20 including a plurality of shift registers 24*a* to 24*n* connected in cascade, and a plurality of logic controllers 22*a* to 22*n* connected to corresponding shift registers 24*a* to 24*n* to control outputs of the shift registers 24*a* to 24*n*.

The shift registers 24*a* to 24*n* output one of the gate high voltage VGH or the gate low voltage VGL corresponding to the state of output signals of the logic controllers 22*a* to 22*n*.

Each of the logic controllers 22*a* to 22*n* may receive a GSP signal or an output signal of a corresponding shift register and the supply voltage Vcc.

The first logic controller 22*a* receives the GSP signal and the supply voltage Vcc. The GSP signal is a start signal to sequentially drive the shift registers 24*a* to 24*n* in the gate driver 20. Other logic controllers 22*b* to 22*n* except for the first logic controller 22*a* receive an output signal of a corresponding shift register and the supply voltage Vcc.

Figure 4:
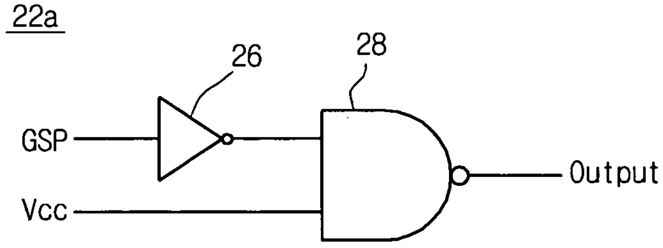
FIG. 4 is a logic circuit diagram of a logic controller of FIG. 3.

The logic controller 22*a* as shown in FIG. 4 includes an inverter 26 receiving the GSP signal and a NAND gate 28 receiving an output signal of the inverter 26 and the supply voltage Vcc.

When the supply voltage Vcc is at a high level, an output of the NAND gate 28 becomes a high level state when the GSP signal is at a high level, and becomes a low level state when the GSP signal is at a low level. Consequently, when the supply voltage Vcc is at a high level, the NAND gate 28 outputs a signal having similar properties to the GSP signal.

When the supply voltage Vcc is at a low level, an output of the NAND gate 28 may be high level state when the GSP signal is at a high level, and may also be a high level when the GSP signal is at a low level. Consequently, when the supply voltage Vcc is at a low level, the NAND gate 28 outputs a high level regardless of the GSP signal level.

As described above, when the supply voltage Vcc is at a high level, Vcc is supplied to each component, and the timing controller 10, the gate driver 20, the data driver 30 of the LCD, the LCD operate normally. When the supply voltage Vcc is at a low level, Vcc is not supplied to each component of the LCD, and the LCD is inoperative.

Accordingly, when power is on, the supply voltage Vcc is at a high level, and when power is off, the supply voltage Vcc is at a low level.

As described above, the gate high voltage VGH can be generated from the supply voltage Vcc. A circuit configuration which may include resistors and capacitors may be used to generate the gate high voltage VGH from the supply voltage Vcc.

When power is on, the supply voltage Vcc is a high level, and thus the gate high voltage VGH may be generated from the supply voltage Vcc.

Figures 5, 6:
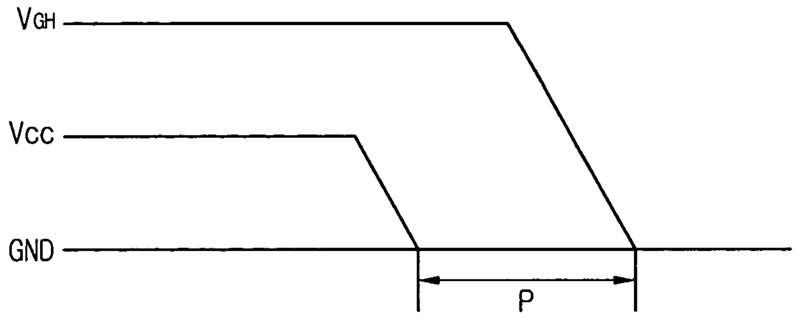
FIG. 5 is a state table of input/output values in the logic controller of FIG. 4.
FIG. 6 is a graph of a temporal relationship between a supply power voltage and a gate high voltage during a shut off transition.

When the supply voltage Vcc and the gate high voltage VGH are at a high level, the supply voltage Vcc effectively instantly changes from a high level to a low level as illustrated in FIG. 6 when the power is shut off. However, the gate high voltage VGH generated from the supply voltage Vcc does not instantly change from a high level into a low level because of an influence of the resistors and capacitors, and changes from a high level into a low level after a predetermined time, which may be several tens of milliseconds.

A residual voltage in the LCD panel may be discharged during an interval where the supply voltage Vcc and the gate high voltage VGH transition from a high level to a low level.

As illustrated in FIG. 6, during an interval where the supply voltage Vcc and the gate high voltage VGH which change from a high level into a low level, the supply voltage Vcc attains a low level before the gate high voltage VGH.

As illustrated in the state table of FIG. 5, the logic controller 22*a* outputs a high level regardless of the GSP signal or an output of a corresponding shift register stage, when the supply voltage Vcc is at a low level. When the supply voltage Vcc is at a low level, all the shift registers 24*a* to 24*n* output the gate high voltage VGH because the gate high voltage VGH maintains a high level relative to the Vcc. The outputted gate high voltage VGH is supplied to each gate line of the LCD to discharge a residual voltage level in the display panel.

Consequently, since the supply voltage Vcc is connected to each of the logic controllers 22*a* to 22*n*, each of the logic controllers 22*a* to 22*n* outputs a high level regardless of the GSP signal or an output of a corresponding shift register when supply voltage Vcc is at a low level.

An output of each of the logic controllers 22*a* to 22*n* is determined according to the output signals of the logic controllers 22*a* to 22*n*. That is, when an output signal of the logic controller is a high level state, the gate high voltage VGH is output, and when an signal is a low level state, the gate low voltage VGL is outputted.

When a power is on, the supply voltage Vcc generated from the power supply 50 is supplied to the timing controller 10, the gate driver 20, and the data driver 30.

The timing controller 10 is driven by the supply voltage Vcc and generates a gate control signal and a data control signal. The timing controller 10 supplies the gate control signal to the gate driver 20 and also supplies the data control signal and image data to the data driver 30.

The gate driver 20 outputs the gate high voltage VGH sequentially to the gate lines in accordance with the gate control signal.

When a power is on and the supply voltage Vcc is at a high level, outputs of logic controllers 22*a* to 22*n* are determined according to an output of the GSP signal or a corresponding shift register output signal. In accordance with these outputs, one of the gate high voltage VGH or the gate low voltage VGL is outputted from the shift registers 24*a* to 24*n*.

When the supply voltage Vcc is at a high level, an output of the first logic controller 22*a* is determined by the GSP signal value. That is, when the GSP signal is at a low level, the first logic controller 22*a* outputs a low level state, and when the GSP signal is in a high level, the first logic controller 22*a* outputs a high level state. When the first logic controller 22*a* outputs a high level state, the first shift register 24*a* outputs a gate high voltage VGH, and when the first logic controller 22*b* outputs a low level state, the first shift register 24*a* output a gate low voltage VGL. Accordingly, the first shift register 24*a* outputs one of the gate high voltage VGH or the gate low voltage VGL according to an output signal of the first logic controller 22*a*.

Likewise, an output of the second logic controller 22*b* may be determined according to an output signal of the first shift register 24*a*. The second shift register 24*b* outputs one of the gate high voltage VGH and the gate low voltage VGL according to the determined output.

Repeating the above described sequence, the remainder of the shift registers 24*c* to 24*n* output one of the gate high voltage VGH or the gate low voltage VGL.

Therefore, when the supply voltage Vcc is in a high level, the first shift register 24*a* outputs the gate high voltage VGH to the first gate line GL1 of the liquid crystal panel 40 and to the second logic controller 22*b*. The second logic controller 22*a* outputs a high level as the supply voltage Vcc and the gate high voltage VGH are at a high level. Accordingly, the second shift register 24*b* outputs the gate high voltage VGH. Likewise, the third and fourth shift registers 24*c* and 24*n* sequentially output the gate high voltage VGH.

Consequently, when the supply voltage Vcc is at a high level in a power-on state, the gate high voltage VGH is sequentially supplied to each of the gate lines GL1 to GLn of the liquid crystal panel 40.

Thus, the gate high voltage VGH of the liquid crystal panel 40 is supplied to each gate line during a portion of each frame, and the gate low voltage VGL is supplied for the remaining portion of the frame.

These operations are performed repetitively for each frame, and thus a residual voltage accumulates in the liquid crystal panel 40 because of the repetitive operations.

On the other hand, when a power is off, the supply voltage Vcc changes from a high level into a low level, and the gate high voltage VGH changes from a high level into a low level after a predetermined time interval P (e.g., several tens of milliseconds). In this situation, the supply voltage Vcc is at a low level and the gate high voltage VGH is at a higher level during the time interval P.

When the supply voltage Vcc is at a low level, each of the logic controllers 22*a* to 22*n*, to which the supply voltage Vcc is connected, outputs a high level state as outputs of the logic controllers 22*a* to 22*n* produce a high level regardless of the GSP signal value. Since the gate high voltage VGH may remain at a high level during the time interval P, each of the shift registers 24*a* to 24*n* outputs the gate high voltage VGH.

Thus, the gate high voltage VGH at a high level is supplied to each of the gate lines of the liquid crystal panel 40 during the transition time interval P and an accumulated residual voltage may be discharged.

When a power is shut off, the gate high voltage VGH of a high level is supplied to the liquid crystal panel during a transition time interval P, and thus a residual voltage can be discharged when the gate high voltage VGH changes from a high level voltage to a low level voltage slower than the supply voltage Vcc when the power is shut off. Thus, resistors as components for effecting discharge of the voltage may be unnecessary.

Although the present invention has been explained by way of the example described above, it should be understood to the ordinary skilled person in the art that the invention is not limited to the example, but rather that various changes or modifications thereof are possible without departing from the spirit of the invention. Accordingly, the scope of the invention shall be determined only by the appended claims and their equivalents.

What is claimed is:

1. A driving circuit comprising:

a gate driver; and a power supply to generate a power supply voltage, the power supply voltage is a high level when power is on and the power supply voltage is a low level when power is off, wherein the power supply voltage enable and disable the gate driver to be driven, wherein the gate driver outputs one of a gate driving signal or a discharge signal according to level of the power supply voltage, wherein the gate driving signal includes a scan signal having a gate high voltage and a gate low voltage, wherein the discharge signal is a voltage with a level equal to level of the gate high voltage, is generated when the power supply voltage is the low level and is supplied to gate lines of a liquid crystal panel to discharge a residual voltage of the liquid crystal panel, wherein the gate driver comprises:

a plurality of shift registers, each connecting an output terminal thereof to a corresponding the gate line of the liquid crystal panel, a plurality of logic controllers, each connecting to an input terminal of a first corresponding shift register to generate a control signal having at least two states and the output terminal of a second corresponding shift register, wherein each of the logic controllers receive the power supply voltage and one of a gate start pulse signal or an output signal of the previous shift register, wherein the logic controller generates the control signal with a high level during a predetermined time when the power supply voltage is the low level, wherein the gate driver outputs the discharge signal when the power supply voltage is the low level and supplies the discharge signal to the gate lines.

2. The driving circuit according to claim 1, wherein the gate driving signal is output when the power supply voltage is at a high level, and the discharge signal is output when the power supply voltage changes from a high level to a low level.

3. The driving circuit according to claim 1, wherein each shift register outputs one of the gate driving signal or the discharge signal according to a state of the control signal.

4. The driving circuit according to claim 1, wherein the first logic controller comprises:

an inverter adapted to receive a start pulse; and a NAND gate wherein the inverter output and the supply voltage are input to the NAND gate.

5. The driving circuit according to claim 4, wherein an output of the first logic controller is determined according to the inverter input voltage when the power supply voltage is supplied.

6. The driving circuit according to claim 4, wherein the first logic controller maintains a high level output for a time interval when the power supply voltage is shut off.

7. The driving circuit according to claim 1, wherein the second logic controller comprises:

an inverter connected to an output of a previous shift register and a NAND gate, wherein the inverter output and the supply voltage are input to the NAND gate.

8. The driving circuit according to claim 7, wherein an output state of the second logic controller is determined by the output of the previous shift register when the supply voltage is supplied at a high level.

9. The driving circuit according to claim 7, wherein the second logic controller maintains a high level state regardless of the output of the previous shift register when the supply voltage is shut off.

10. The driving circuit according to claim 9, wherein the gate signal maintains a high level voltage during a predetermined time interval after the supply voltage is shut off.

11. The driving circuit according to claim 10, wherein a voltage of the liquid crystal panel is discharged by the high level gate voltage.

12. The driving circuit according to claim 10, wherein the predetermined time interval is between the power supply shut off and the gate signal changing to a low level.

13. The driving circuit according to claim 1, wherein the plurality of logic controller output an output signal of a high level state when the supply voltage is shut off, and the shift register outputs the gate signal voltage according to the logic controller output signal.

14. A method of driving an liquid crystal display (LCD) having a liquid crystal panel including gate lines and data lines arranged in a matrix, a gate driver generating a gate signal to activate the gate lines, a data driver for supplying image data to the data lines, and a power supply for generating and supplying a power supply voltage to the gate driver and the data driver, the method comprising:

displaying the image data on the liquid crystal panel in response to the gate signal when the power supply voltage is present at a high voltage; and discharging a voltage of the liquid crystal panel by a discharge signal during a predetermined time interval after the power supply voltage is shut off, wherein the power supply voltage is a high level when power is on and the power supply voltage is a low level when power is off, wherein the gate signal includes a gate high voltage and a gate low voltage, wherein the discharge signal is a voltage with a level equal to level of the gate high voltage, is generated when the power supply voltage is the low level and is supplied to the gate lines of the liquid crystal panel to discharge a residual voltage of the liquid crystal panel, wherein the predetermined time interval is between the power supply voltage changing from a high level to a low level and the gate signal changing from the gate high voltage to the gate low voltage, wherein the gate signal on a first gate line is sent back to the gate driver as a gate driver control signal for a second gate line.

15. The method according to claim 14, wherein the discharge signal is supplied to the gate lines during at least a portion of the predetermined time interval.

16. The method according to claim 14 further comprising:

inputting the gate driver control signal into a logic controller;

outputting from the logic controller one of the high level state voltage and a low level state voltage according to the gate driver control signal when the power supply voltage is at a high voltage;

outputting from the shift register one of a gate high voltage and a gate low voltage according to the output from the logic controller when the power supply voltage is at the high voltage;

outputting a high level state voltage from the logic controller to substitute the gate driver control signal when the power supply voltage is at a low voltage;

outputting the gate high voltage from the shift register when the output from the logic controller is the high level state voltage.

* * * * *